United States Patent

[11] 3,562,416

[72] Inventor Jan Abraham Cornelis Korver
Emmasingel, Eindhoven, Netherlands
[21] Appl. No. 653,254
[22] Filed July 13, 1967
[45] Patented Feb. 9, 1971
[73] Assignee U.S. Philips Corporation
New York, N.Y.
a corporation of Delaware
[32] Priority July 15, 1966
[33] Netherlands
[31] 6,609,958

[54] TELEVISION RECEIVER A.G.C. AND A.F.C. CIRCUITS INCLUDING CASCADED AMPLIFIERS WITH DISTINCT OUTPUTS
6 Claims, 1 Drawing Fig.

[52] U.S. Cl. .......... 178/5.8, 178/5.4, 178/7.3
[51] Int. Cl. .......... H04n 5/52, H04n 9/48
[50] Field of Search .......... 178/5.8A, AFC, 6AFC, AVC, 5.44ACC, 7.3, 5E, 5.4(463), 5.4MC; 330/98

[56] References Cited

UNITED STATES PATENTS

| | | | |
|---|---|---|---|
| 2,908,748 | 10/1959 | Macovski | 178/5.4ACC |
| 3,028,448 | 4/1962 | Baugh, Jr. | 178/5.8 |
| 3,267,210 | 8/1966 | Townsend | 178/5.4ACC |
| 3,297,821 | 1/1967 | Loughlin | 178/7.5E |
| 3,375,325 | 3/1968 | Janssen | 178/5.8 |
| 3,037,071 | 5/1962 | Schaefer et al. | 178/5.4ACC |
| 2,906,817 | 9/1959 | Kidd et al. | 178/7.5TRANS |

FOREIGN PATENTS

| | | | |
|---|---|---|---|
| 613,576 | 1/1961 | Canada | 178/AGC |

*Primary Examiner*—Richard Murray
*Assistant Examiner*—George G. Stellar
*Attorney*—Frank R. Trifari

ABSTRACT: An amplifier circuit for producing a first substantially constant output and a second variable output includes a loop circuit of a first amplifier to which input signals are applied, a second amplifier having an adjustable amplification factor, and a gain control circuit dependent upon the amplitude of the output of the second amplifier for controlling the gain of the first amplifier. The constant output of the second amplifier may be employed in a phase or frequency control circuit in a television receiver, while the variable output of the first amplifier may be the video signal to be applied to a display device.

Figure 1:
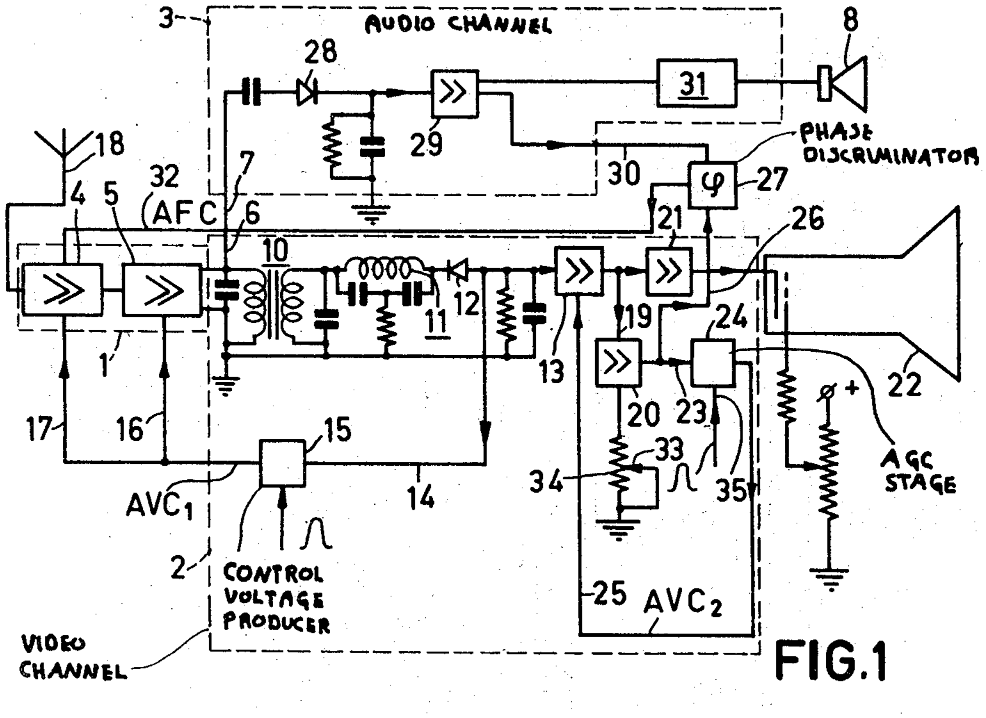

INVENTOR.
JAN A. C. KORVER
BY
Frank R. Trifari
AGENT

TELEVISION RECEIVER A.G.C. AND A.F.C. CIRCUITS INCLUDING CASCADED AMPLIFIERS WITH DISTINCT OUTPUTS

This invention relates to a television receiver comprising circuits for producing a signal for the automatic gain control (AGC) and a signal for the automatic frequency control (AFC), the signal to be handled by the receiver having at least two carriers (a main carrier and a subcarrier or two main carriers) on which information signals of a first kind and information signals of a second kind respectively are modulated, the receiver also including a first channel for amplifying both the signals of the first and the second kind, a second channel for dealing only with signals of the first kind, and a third channel for dealing only with signals of the second kind.

In such a receiver the information of the first kind may be the video signal and the information of the second kind may be the audio signal. In this case there are two main carriers each having an information signal modulated on it. It is also possible that the information of the first kind is the color signal and the information of the second kind is the luminance signal Y. In the latter case, the color signal is modulated on the subcarrier and the whole is modulated, together with the luminance signal Y, on the main carrier. Then the difficulty always arises that if it is desired to control either the contrast of the video signal (in the case of a black and white receiver) or of the luminance signal Y (in the case of a color receiver) or the saturation of the color to be reproduced, the amplitude of the signal from which the AFC voltage is derived, must be maintained constant. If this is omitted the phase and/or the frequency of the controlled local oscillator depends upon the said contrast or saturation control and this is undesirable.

It is furthermore advantageous to take the signal from which the AFC voltage is derived, from the said second channel since this signal then has already been properly amplified. In fact, the voltage necessary for control must have a comparatively great amplitude so that all existing amplifying circuits in the receiver that can be used for this purpose curtail the cost of the receiver, the number of additional amplifying elements required then being reduced to a minimum.

It is fundamentally possible to bring about the control by sliding a tap over a potentiometer circuit. The complete signal is then fed to the potentiometer and the controlled signal may be derived from the tap. However, in the case of the contrast control, this involves the disadvantage that a complicated circuit is necessary since the control has to take place while maintaining the black level constant.

A receiver according to the invention provides a solution to this problem and, to this end, is characterized in that the second channel includes a loop comprising a first and a second amplifier, that the signal to be handled is fed to the input of the first amplifier, that the output of the first amplifier is connected to the input of the second amplifier and that the said output provides the signals for the ultimate display, that the output of the second amplifier provides a signal from which the signal for the automatic gain control ($AGC_2$) is derived and fed back to the first amplifier in order to control the gain thereof and from which the signal for the automatic frequency control is derived, the second amplifier including adjustable means for controlling its gain factor so that the amplitude of the signal appearing at the output of the first amplifier may be varied while maintaining constancy of the output signal from the second amplifier and independently of the signal handled in the third channel.

Figure 2:
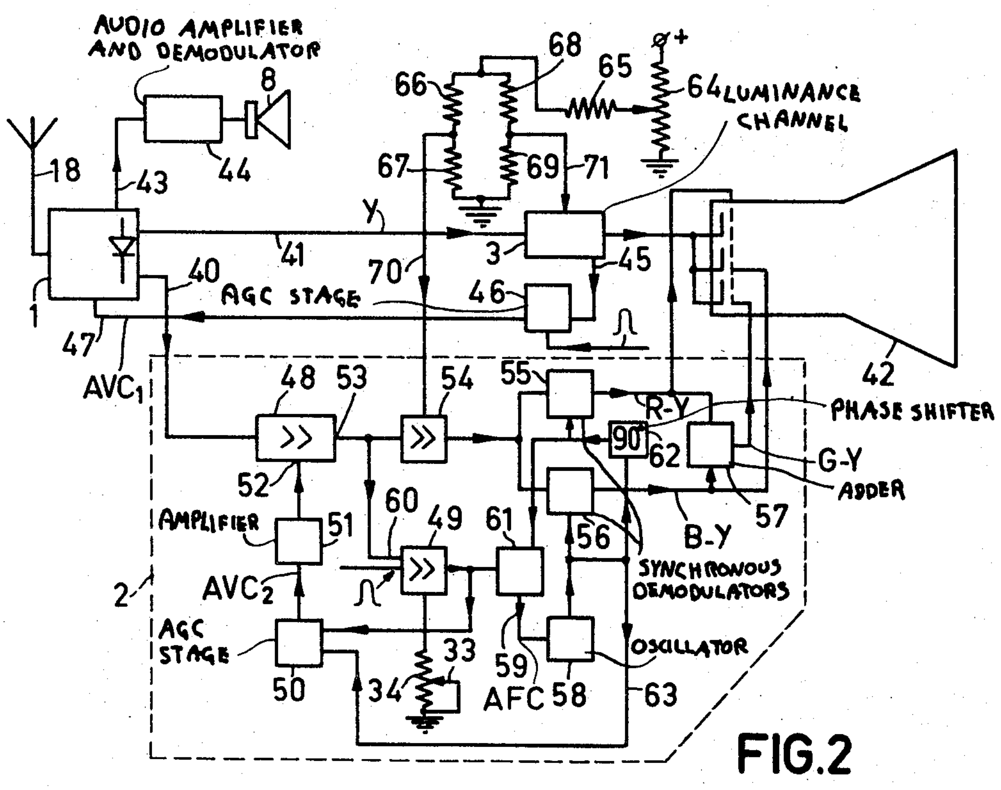

In order that the invention may be readily carried into effect, several embodiments thereof will now be described in detail, by way of example, with reference to the accompanying diagrammatic drawing, in which:

FIG. 1 shows a black and white receiver in which contrast control is used and in which part of the signal from which the AFC voltage is derived, is taken from the video channel; and FIG. 2 shows a color television receiver in which the AFC voltage for the local subcarrier oscillator is derived from the controlled color channel.

In FIG. 1 a first channel 1 serves for amplification of both the video signal and the audio signal. As is well known, the two signals are modulated on main carriers which differ by 5.5 mc/sec. in, for example, the European 625 -line system. The reference numeral 2 indicates the video channel in which the video signal with its synchronizing signals is handled. The audio channel 3 serves for the amplification and demodulation of the frequency-modulated audio signals. The channel 1 includes a high-frequency amplifying stage 4 and a central frequency amplifying stage 5. The high-frequency amplifier 4 also includes the local oscillator and the mixing stage which ensure that the incoming high frequency signal is transformed to the desired central frequency so that this transformed signal can be amplified to the desired level in the central frequency amplifier 5. The central frequency signal thus amplified is derived from the output 6 and, on the one hand, handled in the channel 2 and, on the other hand, led via a conductor 7 to the third channel 3 in which it is converted into an intercarrier signal which is amplified and frequency demodulated in known manner so that an audio signal can be reproduced by a loudspeaker 8. The signal from the output 6 is fed via a final central frequency transformer 10 and an audio stage 11 to a video detector 12 by which the video signal is demodulated in amplitude and fed to a video amplifier 13. The anode of the diode 12 is connected through a lead 14 to a circuit 15 for producing a first voltage for the automatic gain control ($AGO_1$). The output voltage from 15 is applied, on the one hand, through a lead 16 to the central frequency amplifier 5 and, on the other hand, through a lead 17 to the high frequency amplifier 4. The $AGC_1$ voltage ensures that the stages 4 and 5 are controlled so that a signal of constant amplitude appears at the output 6 irrespective of the variations in amplitude at an aerial 18. However, the $AGC_1$ voltage is not essential for the present invention if, for example, the signal incoming at the aerial has a substantially constant amplitude. This is the case, for example, for receivers located in the direct vicinity of a transmitter, so that it is hardly necessary to make allowance for variations in the transmitted signal. The $AGC_1$ voltage is also not necessary for receivers which are included in a closed circuit.

The amplifier 13 may be regarded as the first amplifier of the second channel 2 the input of which is fed with an information signal of the first kind. The output of amplifier 13 is connected, on the one hand, through a lead 19 to the input of a second amplifier 20 in the channel 2 and, on the other hand, to a further amplifier 21 by which the video signal is amplified and fed to the cathode of a display tube 22 for reproducing the television signal. However, the amplifier 21 is not absolutely necessary and may be omitted if the level at the output of the amplifier 13 is high enough. The output of the second amplifier 20 is connected through a first lead 23 to a device 24 which produces a second voltage for the automatic gain control, namely $AVC_2$, which is fed back through a lead 25 to the input of the first amplifier 13 and by means of which the gain factor of stage 13 may be controlled. For this purpose, a valve having a control characteristic may be used in the stage 13, but it is also possible to use instead a transistor which is controlled either forwards or backwards. The output of the second amplifier 20 is also coupled through a lead 26 to a phase discriminator 27. The intercarrier signal produced in a diode 28 in the audio channel is also fed to the phase discriminator 27 via the detector 28, an amplifying stage 29 and a lead 30. The AFC voltage from the phase discriminator 27 is fed through a lead 32 to the high frequency amplifier 4 in which it frequency controls the oscillator present therein. The performance of the phase discriminator 27, which depends upon the audio stage 11, has been described in detail in U.S. Pat. application No. 3,375,325 and need therefore not be explained in this specification. It is only mentioned that the AFC voltage derived from the lead 32 depends upon the tuned position of the high frequency stage 4 and may therefore provide for trimming the oscillator. It will at any rate be evident that the amplitude of the signal derived from the lead 26 must be independent of the contrast control.

This contrast control takes place in the receiver of FIG. 1 by adjusting a tap 33 on a potentiometer 34, which may be regarded as a part of the amplifying stage 20. For example, the potentiometer 34 may be the cathode resistor of a valve which fulfills the function of an amplifying element in the stage 20. However, it is also possible to include a transistor in the amplifying stage 20 and to make the potentiometer 34 fulfill the function of an emitter resistance of the transistor. Furthermore it would be possible for the stage 20 to include a valve having a control characteristic and to vary the negative voltage for the control grid of this valve, and hence the gain factor, by displacing the tap 33.

Let it be assumed that the total gain factor in the $AGC_2$ loop formed by the first amplifier 13, the second amplifier 20 and a device 24 is approximately $C$. This gain factor $C$ is determined by the gain factor $A$ of the adjustable amplifier 20 and the gain factor $B$ of the amplifier 13, so that we have $A \times B = C$. (The contribution of the device 24 has been disregarded but may be taken into account, if desired, by taking $A \times B \times D = C$ where D is the invariable gain factor of the device 24. Since the factor D is unimportant for the explanation following hereinafter, it is taken as unity for the sake of simplicity).

Let it be assumed that the gain factor $A$ of amplifier 20 increases by a factor $a$ and thus becomes $A \times a$ by displacing the tap 33 on resistor 34 in a given direction. However, the $AGC_2$ voltage has a tendency (provided the loop amplification in the $AGC_2$ loop is high enough) to keep the total amplification in the loop constant, so that $C$ may be regarded as substantially constant. This implies that the $AGC_2$ voltage must control back the gain factor of the first amplifier 13 to such an extent that $C$ actually remains constant. From this it follows that the factor $B$ must decrease by a factor $a$ so that we $B/a$. In fact, $$A \cdot a \times \frac{B}{a} = C$$

has then remained unchanged. If therefore the input voltage for the amplifier 13 has a value $V_1$, the output voltage of amplifier 13 was $BV_1$ prior to the displacement of the tap 33. The output voltage of amplifier 20 was $A \cdot B \cdot V_i = CV_i$. After the displacement of the tap 33, the output voltage of amplifier 13 becomes approximately $$V_i \frac{B}{a}$$

From this it will be seen that the displacement of tap 33 has caused a decrease in the output voltage of 13 by a factor $a$. Since the signal is fed via the stage 21 to the display tube 22, it follows therefrom that the contrast of the video signal is controlled by displacing the tap 33. The output voltage of the stage 20 becomes $$V_i \frac{B}{a} \cdot A \cdot a = CV_i$$

from which it follows that this output voltage has remained unchanged. However, this was exactly the intention because the AFC voltage is derived therefrom with the aid of the phase discriminator 27.

It will be evident that a small variation in the output voltage from stage 20 is actually necessary for the backward control of the gain factor $B$ of stage 13. However, this variation is so small as to be negligible if, as previously mentioned, the total loop amplification in the $AGC_2$ loop is high enough. This means that the amplifiers 13 and 20 have, as it were, exchanged their positions, while maintaining the total gain factor $C$ constant. The gain factor of the one decrease and that of the other increases, or vice versa. In fact, it will be evident that, if the amplification of the stage 20 decreases instead of increases, the signal at the output of 13 increases. Complete contrast control is thus possible. If care is also taken to ensure that the pulses fed through a lead 35 to the AGC stage 24 occur during the occurrence of the black level in the video signal, it is also guaranteed that the contrast control takes place with constant black level.

Although in the foregoing the receiver of FIG. 1 has been described only for the display of black and white pictures, but it will be evident that this receiver can readily be made suitable for color reception. In the latter case, the output 6 must have connected to it a fourth channel which is suitable for dealing with the color television signal. The remaining part of the receiver need not be modified for this purpose, except the high frequency stage 4 and the central frequency stage 5, which must be suitable to transmit the color television signal without distortion.

An application in which the second channel 2 is suitable for handling a color signal is shown diagrammatically in FIG. 2. In this Figure, the channel 1 serves for the common amplification of the luminance signal, the chrominance signal and the audio signal. The chrominance signal is fed from channel 1 through a lead 40 to the color channel 2, and through a lead 41 to the third channel 3 by which the luminance signal Y is amplified and fed to the cathodes of a display tube 42, and through a lead 43 to a stage 44 in which the audio signal modulated and fed to the loudspeaker 8. A signal is also derived from the output 45 of the third channel 3 and converted in an AGC stage 46 into a first control voltage for the automatic gain control $AGC_1$, which is fed through a lead 47 to the channel 1 in order to control in it the amplification of the high frequency and central frequency stages. The $AGC_1$ voltage is neither essential in the receiver of FIG. 2 since the AGC loop in the channel 2 could independently ensure that the voltages to be maintained constant actually remain constant even if the amplitude of the signal at the lead 40 were not constant. This AGC loop in the receiver of FIG. 2 is formed in a similar manner as in the receiver of FIG. 1, by a loop comprising a first amplifier 48, a second amplifier 49, an ACG stage 50 and a stage 51 for amplifying the ACG voltage. The output signal from the stage 51 is fed to an input 52 of the amplifier 48 to control its gain factor. Similarly as in the receiver of FIG. 1, the second loop is denominated as $AGC_2$ in FIG. 2 to indicate that a separate second control circuit is concerned. The amplifier 48 is a so-called band-pass amplifier, which means that it includes a band-pass filter which filters the luminance signal Y and the synchronizing signals out of the complete television signal so that only the color signal modulated on the subcarrier appears at the output 53 of the amplifier 48. This signal usually also includes a so-called burst signal which is cotransmitted on the back porch of the line-synchronizing signals and which has the same frequency as the subcarrier. This color signal is fed to an amplifier 54 whose output has connected to it two synchronous demodulators 55 and 56 at the outputs of which the red color difference signal (R—Y) and the blue color difference signal (B—Y) respectively appear. From these two color difference signals there is formed in an adding stage 57 the third color difference signal (G—Y) which represents the green color difference signal. These three color difference signals are fed to the three Wehnelt cylinders of the three guns of the display tube 42. Since the luminance signal Y is fed via channel 3 to the cathodes of tube 42, this tube is thus fed with the signals necessary for the display of a color picture. The receiver described is suitable for the reception of a so-called NTSC signal. To permit the color signals of such a signal to be demodulated synchronously in the demodulators 55 and 56, these stages must be fed with subcarriers regenerated in a local oscillator 58. To ensure that both the frequency and the phase of the output signal of oscillator 58 are synchronous with the said burst signal, the oscillator 58 must be fed with an AFC voltage through a lead 59. This AFC voltage is produced due to, on the one hand, keying pulses being fed through a lead to the amplifier 49 so that only the burst signal is active at a stage 61 and, on the other hand, the subcarrier signal being fed to the stage 61 through a 90° phase-shifting stage 62. The keying pulses reaching the stage 49 through the lead 60 occur just at the instants when the burst signal is present in the color signal so that the stage 49 also fulfills the function of a so-called burst keying stage. The output signal from oscillator 58 is also fed through a lead 63, but not shifted in phase, to the AGC stage 50, so that the second automatic gain control voltage $AGC_2$ appears at the output thereof.

The operation of the $AGC_2$ loop in FIG. 2 is similar to that in FIG. 1. When the gain factor of the second amplifier 49 is controlled by displacing the tap 33, it may be caused to increase whereby the gain factor of the stage 48 is controlled backwards due to the action of the $AGC_2$ voltage, resulting in a reduced signal at the output 53. Since the gain factor of stage 49 has increased almost to the same extent as that of stage 48 has decreased, the output voltage of this second amplifier remains constant so that in this case also it is achieved that the AFC voltage is substantially constant despite the fact that the saturation of the color can be controlled with the tap 33. In fact, displacement of the tap 33 causes only variation in the amplitude of the color signal. It will be evident that displacement of the tap 33 in a direction opposite to that described hereinbefore will cause a decrease in the gain factor of stage 49 and a substantially equal increase in that of stage 48.

In the embodiment of FIG. 2, too, the amplifier 54 is not absolutely necessary if the output voltage of the stage 53 would have an amplitude great enough to control the synchronous demodulators 55 and 56 in the desired manner. However, the stage 54 in the receiver of FIG. 2 fulfills still another function. In fact, it is desirable to be able to control also the contrast in the receiver in such manner that not only the luminance signal Y but also the amplitude of the chrominance signal can be varied by this contrast control. This is achieved by providing a potentiometer circuit. Such a potentiometer circuit comprises a resistor 64 and a series resistor 65 which is connected to the tapping thereof. The other end of resistor 65 leads to a voltage-divider circuit comprising resistors 66, 67, 68 and 69. The common point of the resistors 66 and 67 is connected through a lead 70 to the amplifier 54 and the common point of the resistors 68 and 69 is connected through a lead 71 to an input of the third channel 3. The $AGC_1$ voltage is varied by varying the direct voltage reaching through the lead 71 the third channel 3, resulting in a variation in the gain factor of channel 1. Consequently the amplitude of the signal Y varies, but also that of the signal fed through the lead 40 to the first amplifier 48. However, since the loop in the second channel which provides the second control voltage $AGC_2$, has a tendency to keep the color signal at the output 53 constant, this would mean that displacement of the tap on potentiometer 64 resulted in a variation in saturation of the displayed color. However, as has been previously explained, this saturation control must be brought about by displacing the tap 33 on potentiometer 34. However, since a variation was fed through the lead 71 to the channel 3 similar to that applied through the lead 70 to the amplifier 54, the gain factor of the stage 54 will vary so much as is necessary for varying the amplitude of the signal at its output to the same extent as the variation of the luminance signal Y at the output of the channel 3 leading to the display tube 43. It is thus achieved that displacement of the tap on potentiometer 64 brings about a control which maintains the ratio between the amplitudes of the luminance signal and the color signal. The desired saturation of color may then be adjusted at will with the tap 33 by the operator of the receiver.

This method of control affords the advantage that the first control voltage $AGC_1$ controls as it were the low frequencies in the signal, since this control takes place on the tops of the synchronizing signals or on the black level, which corresponds to a recurrence frequency of approximately 15 kc./s., whereas the second control voltage $AGC_2$ gets its information from the burst signal which acts on a frequency of approximately 4.5 mc/sec. (at least in the European version of the NTSC signal), so that information about the frequencies in the color signal is obtained therewith. It is thus achieved that both the chrominance signal and the luminance signal are maintained constant in the desired manner by the first ($AGC_1$) and second ($AGC_2$) control voltages. Nevertheless the desired contrast and saturation control is possible.

In the foregoing it has been taken for granted that the voltage for deriving the first control voltage ($AGC_1$) is taken from the terminal 45 of the third channel 3. If therefore the contrast control is brought about by the first control voltage $AGC_1$, this means, as previously mentioned, that both the amplitude of the luminance signal Y at the terminal 41 and the amplitude of the color signal at the terminal 40 vary. Since the output of 53 is maintained constant by the control voltage $AGC_1$ it is then necessary to make the amplification of 54 vary with the variations in the luminance signal. However, it is also possible for the signal from which the first control voltage $AGC_1$ is derived to be taken directly from the lead 41 instead of the terminal 45. In this case, displacement of the tap on potentiometer 64 will have to vary directly the gain factor of channel 3, but the signals at the leads 41 and 40 are then not varied thereby. In this case also it is necessary, however, that the gain factor of the third amplifier 54 is also controlled because the signal Y at the output of channel 3 varied due to the said contrast control, and in order to maintain a constant ratio between the luminance signal Y and the chrominance signal, the signal at the output of the third amplifier 54 must therefore also be controlled.

However, it is alternatively possible to interchange the functions of the amplifiers 49 and 54. In this case a control voltage must be fed through the lead 70 to the amplifier 49 in order to be able to control its gain factor and, furthermore, the resistor 34 must be connected to the amplifier 54 so that displacement of the tap 33 causes variation in the gain factor of the latter stage. Displacement of the tap on resistor 64 in this case again causes variation in the output signal of the channel 3 and in the output voltage at the lead 40. However, the $AGC_2$ loop again tends to keep the output voltage of the amplifier 49 constant. Since the voltage variation now has been fed through the lead 70 to the second amplifier 49, the output voltage from the first amplifier 48 will vary to the same extent as that of the third channel 3. The common contrast and saturation control can thus be obtained. The separate saturation control is effected by varying the gain factor of the stage 54.

In conclusion, it should be noted that it is possible to bring about the common contrast-saturation control as well as the separate saturation control solely by means of the stage 49. In this case the lead 70 must go to the second amplifier 49 instead of the third amplifier 54.

Displacement of the tap 33 then results in saturation control in the manner as originally described. Displacement of the tap of resistor 64 results in common contrast and saturation control in the manner as has been described for the previous case.

Although, in the foregoing, the receiver of FIG. 2 has been described for the reception of an NTSC signal, this receiver may be made suitable in a simple manner for the reception of a PAL signal. The only modification which has to be made is that after that the red color difference signal (R—Y), which is 180° phase-shifted from line to line in the PAL signal, is handled in the proper way. This may be effected in known manner by providing a delay line and a switching stage by which either the red color difference signal itself or the subcarrier signal from oscillator 58 is 180° shifted in phase from line to line. Since the PAL signal also includes a burst signal which occurs on the back porch of the line synchronizing pulses, the amplifier 49 can remain unchanged. However, it is also possible to make the amplifier 49 respond solely to the color signal itself. In this case it is not necessary to feed keying pulses through the lead 60 to the second amplifier 49. True in this case there exists dependence upon the amplitude variations of the color signal, but by using peak detection in the stage 50 and illuminating the rapid variations in color amplitude by strong smoothing, it is possible to bring about a control which responds to the mean content of the color signal. Such a control may also operate satisfactorily with an NTSC receiver as well as a PAL receiver.

I claim:

1. An amplifier circuit comprising a source of signals, a first gain controllable amplifier stage, means applying said signals to said first stage, a second gain controllable amplifier stage, means applying the output of said first stage to said second stage, means connected to the output of said second stage for producing a control voltage dependent upon the amplitude of output signals from said second stage, means for keeping the product of the amplification factors of said first and second stages substantially constant for all of the signals applied to said first stage comprising means applying said control voltage to said first stage for controlling the amplification of all of the signals in said first stage, first and second output circuits connected to the outputs of said first and second stages respectively, and means for adjusting the amplification of said second stage independently of time, whereby all of the signals derived from said second output circuit have a substantially constant amplitude and all of the signals derived from said first output circuit have an amplitude inversely dependent upon the amplification of said second stage.

2. A circuit as claimed in claim 1 wherein said control voltage applying means comprises a gate circuit, and further comprising a source of periodic gating pulses coupled to control said gate circuit.

3. A circuit as claimed in claim 1 wherein said signals comprise a video signal and a frequency-modulated audio signal, and said first stage applying means applies said video signal to said first stage; and further comprising means for detecting said audio signals coupled to said source of signals, and means for generating an automatic frequency control voltage including a phase detector coupled to output of both said detector and said audio signal second stage.

4. A circuit as claimed in claim 1 wherein said signals comprise video luminance and chrominance signals, and said first stage applying means applies said chrominance signal to said first stage; and further comprising means for amplifying said luminance signal, a third amplifier stage having an input coupled to the output of said first stage, and means for varying the gain of both said luminance amplifying means and said third amplifying stage whereby the saturation remains a constant.

5. A circuit as claimed in claim 4 wherein said means for varying both said luminance amplifying means and said third stage comprises a source of direct current and a potentiometer circuit coupled to said direct current source and luminance amplifying means and said third stage.

6. A circuit as claimed in claim 4 further comprising two synchronous detectors coupled to the output of said third stage to detect said luminance signal, and a subcarrier oscillator coupled to the output of said second stage to provide a reference carrier for said synchronous detectors.